C. LE G. FORTESCUE.
ALTERNATING CURRENT MOTOR.
APPLICATION FILED FEB. 21, 1911.

1,082,511.

Patented Dec. 30, 1913.

WITNESSES:
C. L. Belcher

INVENTOR
Charles Le G. Fortescue
BY
Wiley G. Carr
ATTORNEY

UNITED STATES PATENT OFFICE.

CHARLES LE G. FORTESCUE, OF PITTSBURGH, PENNSYLVANIA, ASSIGNOR TO WESTINGHOUSE ELECTRIC AND MANUFACTURING COMPANY, A CORPORATION OF PENNSYLVANIA.

ALTERNATING-CURRENT MOTOR.

1,082,511.  Specification of Letters Patent.  Patented Dec. 30, 1913.

Application filed February 21, 1911. Serial No. 609,940.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Alternating-Current Motors, of which the following is a specification.

My invention relates to dynamo-electric machines and it has special reference to the control and regulation of single phase alternating current motors of the commutator type.

The object of my invention is to provide means for varying the speed and characteristics of motors of the class above indicated in a simple and inexpensive manner without material loss of energy.

Single phase series-connected alternating current motors of the commutator type have been extensively utilized for railway work and the voltage applied to the terminals of the motor in starting has usually been varied by means of a large number of taps on a main transformer which is energized from the relatively high-potential line conductor.

My invention is not intended to replace the main transformer or other voltage-regulating means, but permits a very gradual acceleration and a careful regulation to be effected with a very few taps on the main transformer.

According to my present invention, I so associate an auxiliary transformer with the motor as to permit a relative adjustment between the armature current and the field current. The auxiliary transformer is relatively small and inexpensive and is provided with a number of taps representing small steps in the regulation of the motor.

In starting the motor, the auxiliary transformer may be regulated over its complete range between successive steps in the regulation of the main transformer.

Figure 1:
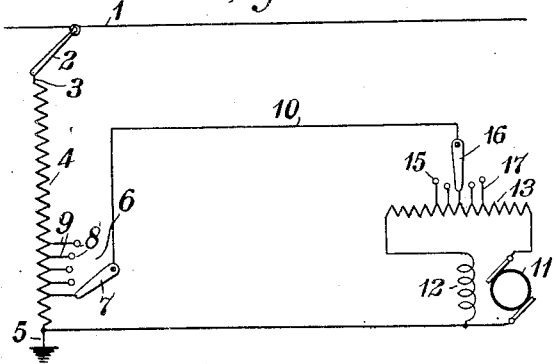
Figure 2:
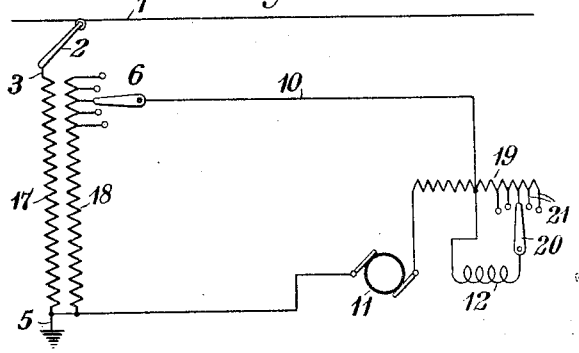
Figure 3:
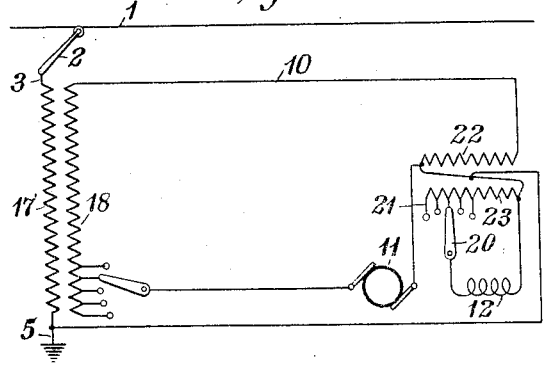

Figure 1 of the accompanying drawing is a diagrammatic view showing the arrangement and circuit connections of a system embodying my invention, and Figs. 2 and 3 are similar views showing modifications of my invention.

Referring to Fig. 1 of the drawings, energy is supplied from any suitable source (not shown), through line conductor 1, trolley 2 and conductor 3 to a transformer 4, the opposite terminal of the transformer being connected to ground or to a return circuit conductor 5. A controller 6, having a regulating arm 7 and contact terminals 8 which are connected to taps 9 of the transformer 4, is adapted to govern the voltage applied to the motor circuit conductor 10.

The electric motor shown in the diagram comprises an armature 11 and a field magnet winding 12, a transformer winding 13 having a plurality of intermediate taps 14 being connected in circuit between the motor windings 11 and 12. The taps 14 are respectively connected to contact terminals 15 which may be engaged successively by an arm 16, said arm being connected to the conductor 10. The taps 9 on the main transformer are relatively few and quite widely separated, while the taps 14 on the transformer 13 are close together and are quite numerous, the arrangement of parts being such that a very gradual acceleration or retardation of the motor may be effected by adjusting the arm 16 over its entire range for each voltage step as affected by an adjustment of the arm 7.

While I have shown a single motor for the sake of simplicity in illustration, it will, of course, be understood that two or more motors will usually be employed and that the capacity of the transformer 4 will be very much greater than that of the transformer 13. It will also be understood that it is very much less expensive to provide the small low-voltage transformer 13 with a large number of taps and the transformer 4 with a small number of taps than to supply the large high-voltage transformer with a large number of taps.

It is evident that the current in the path through the armature winding and the current in the path through the field magnet winding will each be approximately inversely proportional to the turns of the transformer winding 13 which are included in the same branch and consequently by properly setting the arm 16 during the normal operation of the motor, the characteristics of the motor may be materially altered. For example, the flow of current may be largely increased without abnormally increasing the armature current. In other words, the current traversing the field winding may be varied relative to the current traversing the armature winding and this adjustment may be utilized not only for regulation but also in combination with a comparatively small number of voltage-variations in the motor supply circuit for effecting a gradual acceleration of the motor.

In Fig. 2 of the drawings, the transformer 4 is replaced by a two-winding transformer having a primary winding 17 and a secondary winding 18, and a transformer winding 13 is replaced by a winding 19 to the middle point of which one terminal of the field winding 12 and the conductor 10 are permanently connected. The armature 11 is permanently connected to one end of the winding 19 and the free terminal of the winding 12 is connected to a point near the opposite end of the transformer winding, through a contact arm 20, which engages any one of a plurality of contact terminals for the respective taps 21. Substantially the same regulation is effected by the arm 20 as that effected by the arm 16 of Fig. 1.

In Fig. 3 the transformer winding 19 of Fig. 2 is replaced by windings 22 and 23, the winding 22 being connected in circuit between the conductor 10 and one terminal of the armature 11, and the other terminal of the armature being connected to the controller 6. One terminal of the field winding 12 is connected to the junction of the armature 11 and the windings 22 and 23 and also to earth, and the opposite terminal of the field winding is connected to any one of several points in the winding 23 through the regulating arm 20 and taps 21. The arm 20, in this figure, effects the same regulation as in the other figures.

I desire that the scope of my invention shall only be limited by the appended claims.

I claim as my invention:

1. The combination with an alternating current motor having its armature and field magnet windings connected in multiple circuit, of means for varying the relative currents traversing the respective branches of said circuit, said means comprising means for varying the relative inductance of said branches.

2. The combination with an alternating current motor having an armature and field magnet windings connected in multiple circuit, of a transformer winding, a portion of which is connected in one branch of the motor circuit and a second portion of which is connected in the other branch of the motor circuit.

3. The combination with an alternating current motor having armature and field magnet windings connected in multiple circuit, of external adjustable means for maintaining a desired relation between the currents in armature and field magnet windings and comprising a divided transformer winding having its parts respectively connected in the field and armature branches of the motor circuit.

4. The combination with an alternating current motor having armature and field magnet windings and a commutator, and a source of current, of a regulating transformer which is connected between the armature and field magnet windings of the motor, one terminal of said source being connected to an intermediate point in said regulating transformer and the other terminal of said source being connected to the remaining terminals of the armature and field windings.

In testimony whereof, I have hereunto subscribed my name this 13th day of Feb. 1911.

CHARLES LE G. FORTESCUE.

Witnesses:
R. J. DEARBORN,
B. B. HINES.